US012176806B2

(12) United States Patent
Cai et al.

(10) Patent No.: US 12,176,806 B2
(45) Date of Patent: Dec. 24, 2024

(54) POWER FACTOR CORRECTION CIRCUIT, CONTROL METHOD AND ELECTRICAL APPLIANCE

(71) Applicants: Guangdong Midea White Home Appliance Technology Innovation Center Co., Ltd., Foshan (CN); Midea Group Co., Ltd., Foshan (CN)

(72) Inventors: Li Cai, Foshan (CN); Yi Liu, Foshan (CN); Kai Jiang, Foshan (CN); Hong Bin, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD., Foshan (CN)

(*) Notice: Subject to any disclaimer, the term of this patent is extended or adjusted under 35 U.S.C. 154(b) by 435 days.

(21) Appl. No.: 17/529,168

(22) Filed: Nov. 17, 2021

(65) Prior Publication Data

US 2022/0077769 A1 Mar. 10, 2022

Related U.S. Application Data

(63) Continuation of application No. PCT/CN2019/123355, filed on Dec. 5, 2019.

(30) Foreign Application Priority Data

May 22, 2019 (CN) .......................... 201910430821.1

(51) Int. Cl.
*H02M 1/42* (2007.01)
*H02M 1/00* (2007.01)
*H02M 7/23* (2006.01)

(52) U.S. Cl.
CPC ....... *H02M 1/4233* (2013.01); *H02M 1/0085* (2021.05); *H02M 7/23* (2013.01)

(58) Field of Classification Search
CPC ..... H02M 1/4233; H02M 1/0085; H02M 7/23
See application file for complete search history.

(56) References Cited

U.S. PATENT DOCUMENTS

| 2015/0280547 A1 | 10/2015 | Pu et al. | |
| 2016/0079888 A1* | 3/2016 | Li | H01F 17/04 318/400.3 |

FOREIGN PATENT DOCUMENTS

| CN | 102035364 A | 4/2011 |
| CN | 202395655 U * | 8/2012 |

(Continued)

OTHER PUBLICATIONS

Guangdong Midea White Appliance Technology Innovation Center Co., Ltd., First Notice of Examination Opinions, CN Application No. 201910430821.1, Dec. 26, 2019, 26 pgs.

(Continued)

*Primary Examiner* — Jue Zhang
(74) *Attorney, Agent, or Firm* — Morgan, Lewis & Bockius LLP

(57) ABSTRACT

The present disclosure relates to a power factor correction circuit, a control method, and an electrical appliance. The power factor correction circuit may include: a power regulation branch, including a first switching unit, a second switching unit and a branch sampling resistor connected in series sequentially; an inductive branch, connected between an AC power source and a power regulation branch; a rectifier branch, including a first rectifier unit and a second rectifier unit, the rectifier branch may include a main line sampling resistor; a capacitance branch; a control circuit sampling a branch current flowing through each of the branch sampling resistors and a main line current flowing (Continued)

through the main line sampling resistor respectively, and controlling the switching of each power regulation branch sequentially. With the branch sampling resistor and the main line sampling resistor, the overall cost of the power factor correction circuit may be reduced.

14 Claims, 7 Drawing Sheets

(56) References Cited

FOREIGN PATENT DOCUMENTS

| CN | 103809007 A | 5/2014 |
|----|-------------|--------|
| CN | 104135002 A | 11/2014 |
| CN | 110198119 A | 9/2019 |
| JP | 2010233439 A | 10/2010 |
| JP | 2015023606 A | 2/2015 |
| JP | 2017505097 A | 2/2017 |

OTHER PUBLICATIONS

Guangdong Midea White Appliance Technology Innovation Center Co., Ltd., Second Notice of Examination Opinions, CN Application No. 201910430821.1, Mar. 4, 2020, 21 pgs.

International Search Report, PCT/CN2019/123355, Feb. 26, 2020, 13 pgs.

Midea Group Co., Ltd., Japanese Office Action, JP Patent Application No. 2021-568367, Nov. 22, 2022, 8 pgs.

Midea Group Co., Ltd., Japanese Decision to Grant Patent, JP Patent Application No. 2021-568367, Apr. 4, 2023, 5 pgs.

Midea Group Co., Ltd., WO, PCT/CN2019/123355, Feb. 26, 2020, 6 pgs.

Midea Group Co., Ltd., IPRP, PCT/CN2019/123355, Sep. 28, 2021, 7 pgs.

* cited by examiner

POWER FACTOR CORRECTION CIRCUIT, CONTROL METHOD AND ELECTRICAL APPLIANCE

CROSS REFERENCE TO RELATED APPLICATION

The present application is a continuation application of International (PCT) Patent Application No. PCT/CN2019/123355 filed on Dec. 5, 2019, which claims priority to Chinese Patent Application No. 201910430821.1, filed on May 22, 2019 in the National Intellectual Property Administration of China, the entire contents of which are hereby incorporated by reference in their entireties.

TECHNICAL FIELD

The present application relates to the field of circuit technology, and more particularly to a power factor correction circuit, a control method and an electrical appliance.

BACKGROUND

In order to eliminate power grid harmonic contamination, increase power factor, a Power Factor Correction (PFC) converter may be added at an input of an electronic device. A solution commonly used in the industry is a boost chopper with a rectifier bridge. The bridgeless totem-pole PFC is a high efficiency topology scheme that produces an application value in recent years due to the rise of Wide Bandgap Semiconductor (WBG) new devices. With the removal of the rectifier bridge, one diode is eliminated from the electrical current conduction path, leading to the reduction of the conduction loss of the diodes and the enhancement of the system.

The existing power factor correction circuits require current sampling of each inductive branch in order to control the current of each parallel branch and achieve a current sharing. A Hall circuit is usually used to collect the current of each inductive branch, which is costly.

SUMMARY OF THE DISCLOSURE

The present application generally provides a power factor correction circuit, a control method, a storage medium, an electrical appliance, and a household appliance to solve the problem of the power factor correction circuit on the high cost of current sampling of the inductive branch.

To solve the above-mentioned technical problem, one technical solution employed in the present application is to provide a power factor correction circuit, a control method, a storage medium, an electrical appliance, and a household appliance. The power factor correction circuit may include: at least two power regulation branches connected in parallel with each other, each of the power regulation branches may include a first switching unit, a second switching unit and a branch sampling resistor connected in series sequentially; at least two inductive branches, a first end of each of the inductive branches may be connected to a first end of an AC power source, and a second end of each of the inductive branch may be connected between the first switching unit and the second switching unit of one corresponding power regulation branch; a rectifier branch, including a first rectifier unit and a second rectifier unit that are connected in parallel with the power regulation branch and connected in series with each other, the rectifier branch may further include a main line sampling resistor, a first end of the main line sampling resistor may be connected between the first rectifier unit and the second rectifier unit, and a second end of the main line sampling resistor maybe connected to a second end of the AC power source; a capacitance branch connected in parallel with the power regulation branch and a load; and a control circuit sampling a branch current flowing through each branch sampling resistor and a main line current flowing through the main line sampling resistor, and performing a switching control on each of the power regulation branches according to the sampled branch currents and main line current.

To solve the above-mentioned technical problem, another technical solution adopted by the present disclosure is to provide a control method of the power factor correction circuit. The control method may include: acquiring a branch current flowing through a branch sampling resistor of each power regulation branch and a main line current flowing through a main line sampling resistor of each rectifier branch; performing a switching control on each of the power regulation branches according to the branch current and the main line current.

To solve the above-mentioned technical problem, another technical solution adopted by the present disclosure is to provide an electrical appliance. The electrical appliance may include a processor and a memory connected with each other. The memory may store a computer program that, when executed by the processor, performs operations of the method as described above.

The benefit of the present application is that, different from the prior art, the present application discloses a power factor correction circuit, a control method, a storage medium, an electrical appliance and a household appliance. Branch sampling resistors are arranged in series in each of the power regulation branches that are connected in parallel with each other, and the main line sampling resistor is arranged. The first end of the main line sampling resistor is connected between the first rectifier unit and the second rectifier unit, the second end of the main line sampling resistor is connected to a second end of the AC power source. The branch currents flowing through each of the branch sampling resistors and the main line current flowing through the main line sampling resistor are thus sampled, to acquire the current flowing through the inductive branch indirectly. In this way, the requirement for the electrical current sampling devices may be reduced, electrical current sampling schemes that are relatively cheaper may be adopted and the overall cost of the power factor correction circuit may be effectively reduced.

BRIEF DESCRIPTION OF THE DRAWINGS

In order to more clearly illustrate technical solutions of the present disclosure or the prior art, the drawings required in the description of the embodiments or the prior art will be briefly introduced below. Obviously, the drawings in the following description are only some embodiments of the present disclosure. For those of ordinary skills in the art, other drawings could be obtained based on these drawings without creative efforts.

DETAILED DESCRIPTION

Technical solutions in embodiments of the present disclosure will be described clearly and thoroughly in connection with accompanying drawing of the embodiments of the present disclosure. Obviously, the described embodiments are only parts of the embodiments, but not all of them. All other embodiments by a person of ordinary skills in the art based on embodiments of the present disclosure without creative efforts should all be within the protection scope of the present disclosure.

The terms 'first', 'second', and 'third' in this disclosure are only for the purpose of description, and cannot be construed as indicating or implying relative importance or implicitly indicating the number of technical features referred to. Therefore, the features defined with 'first', 'second', and 'third' may explicitly or implicitly include at least one of the said features. In the description of the present disclosure, "a plurality of" means at least two, such as two, three, etc., unless otherwise specifically defined. In addition, the terms "include", "comprise" and any variations thereof are intended to cover non-exclusive inclusion. For example, a process, a method, a system, a product, or a device that includes a series of operations or units is not limited to the listed operations or units, but optionally includes unlisted operations or units, or optionally also includes other operations or units inherent to these processes, methods, products or devices.

Reference to "embodiments" herein means that a specific feature, structure or characteristic described in conjunction with the embodiments may be included in at least one embodiment of the present disclosure. The appearance of this phrase in various locations in the specification does not necessarily refer to the same embodiment, nor is it an independent or alternative embodiment mutually exclusive with other embodiments. Those skilled in the art may explicitly and implicitly understand that, the embodiments described herein may be combined with other embodiments.

Figure 1:
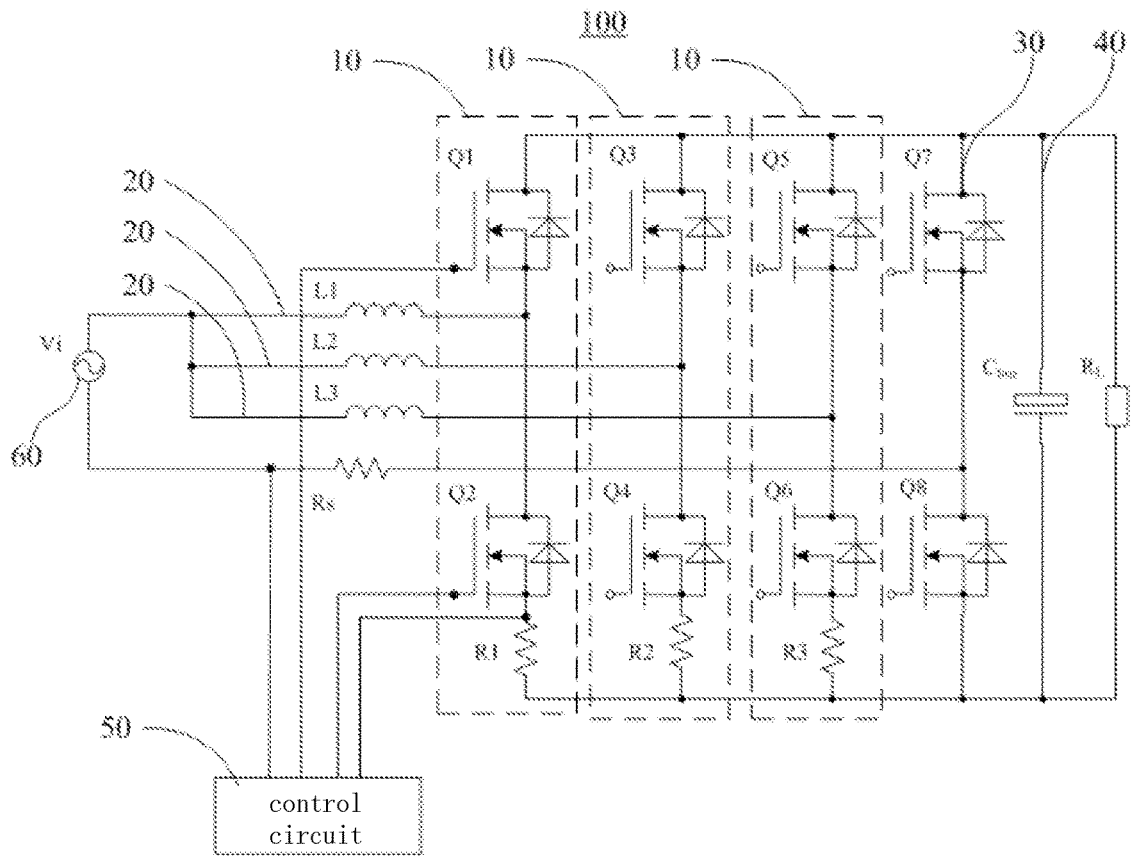
FIG. 1 is a schematic structural diagram of a power factor correction circuit according to some embodiments of the present application.

Referring to FIG. 1, FIG. 1 is a schematic structural diagram of a power factor correction circuit according to some embodiments of the present application.

The connection relationship between a control circuit 50 and each power regulation branch 10 are all the same. In FIG. 1, only the connection relationship between the control circuit 50 and one of the power regulation branches 10 is illustrated, while the connection relationship between the control circuit 50 and other power regulation branches 10 are omitted, but this does mean that other power regulation branches 10 are not connected to the control circuit 50. FIG. 1 also shows three power regulation branches 10. For ease of description, a first switching unit and a second switching unit in different power regulation branches have different notations. In the following description, the first power regulation branch 10 will be mainly referred to as an example.

The power factor correction circuit 100 may include at least two power regulation branches 10 in parallel with one another, at least two inductive branches 20, a rectifier branch 30, a capacitance branch 40 and a control circuit 50. The power regulation branch 10 may be configured to receive drive signals to regulate the branch current $i_{L1}$ of the power regulation branch 10, thereby enabling control of the branch current $i_{L1}$ and the output voltage $V_o$ of the power factor correction circuit 100. That is, the input current of the power factor correction circuit 100 may be corrected by the at least two power regulation branches 10 connected in parallel with each other to a sinusoidal wave in phase with and having a same frequency with the AC power source, such that the output voltage $V_o$ of the power factor correction circuit 100 may be stable.

The at least two power regulation branches 10 may be connected in parallel with each other, and each power regulation branch 10 may include a first switching unit $Q_1$, a second switching unit $Q_2$ and a branch sampling resistor $R_1$ connected in series sequentially.

In some embodiments, the first switching unit $Q_1$ and the second switching unit $Q_2$ may be Metal-Oxide-Semiconductor Field-Effect Transistors (MOSFET), such as GaN MOSFET, super junction MOSFET or SiC-MOSFET.

Figure 8:
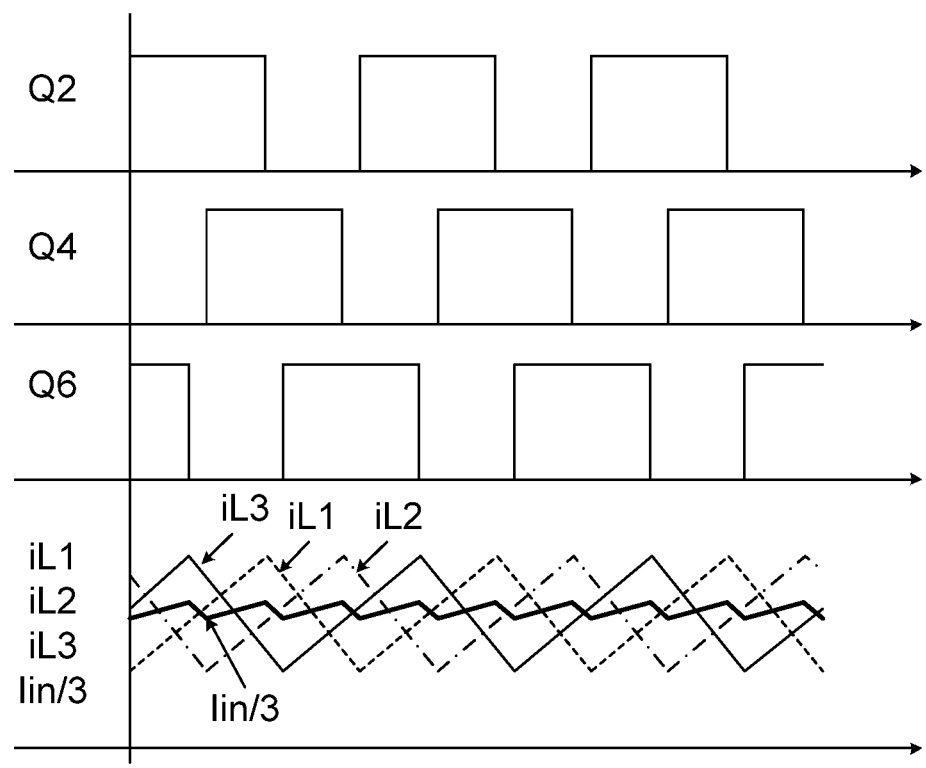
FIG. 8 is a waveform diagram of a switching control signal, the electrical current of each branch, and equivalent branch current for each of the power regulation branches in the power factor correction circuit of FIG. 1.

It should be noted that, the controlling modes of each of the power regulation branches 10 are the same. The switching control signals of the at least two power regulation branches 10 connected in parallel with each other are in one cycle sequentially shifted by a certain phase angle. The certain phase angle may be the ratio of 360 degrees to the number of power regulation branches 10, and the switching control signal is a PWM (Pulse Width Modulation) drive signal. For example, when the power factor correction circuit 100 includes two power regulation branches 10, the corresponding switching control signals may be phase-shifted by 180 degrees from each other in one cycle. As are shown in FIGS. 1 and 8, the power factor correction circuit 100 includes three power regulation branches 10, and the corresponding switching control signals are phase-shifted by 120 degrees in one cycle.

Correspondingly, the number of the at least two inductive branches 20 is the same as the number of the at least two power regulation branches 10, and the at least two inductive branches 20 have a one-to-one correspondence with the at least two power regulation branches 10. Specifically, a first end of the inductive branch 20 may be connected to a first end of the AC power source 60, and a second end of the inductive branch 20 may be connected between the first switching unit $Q_1$ and the second switching unit $Q_2$ of the corresponding power regulation branch 10.

For example, the three power regulation branches 10 connected in parallel with each other may correspond to three inductive branches 20. Each inductive branch 20 may be connected between the AC power source 60 and a corresponding power regulation branch 10. There may be 2, 4 or 5 paralleled power regulation branches 10, and correspondingly there may be 2, 4 or 5 inductive branches 20.

Specifically, the inductive branch 20 may include an inductor $L_1$. A first end of the inductor $L_1$ may be connected to a first end of the AC power source 60. A second end of the inductor $L_1$ may be connected between the first switching unit $Q_1$ and the second switching unit $Q_2$ of a corresponding power regulation branch 10.

The rectifier branch 30 may include a first rectifier unit $Q_7$ and a second rectifier unit $Q_8$ in parallel with the power regulation branch 10 and in series with each other. That is, the first rectifier unit $Q_7$ and the second rectifier unit $Q_8$ in series with each other may as a whole unit be in parallel with the power regulation branch 10. The rectifier branch 30 may further include a main line sampling resistor $R_S$. A first end of the main line sampling resistor $R_S$ may be connected between the first rectifier unit $Q_7$ and the second rectifier unit $Q_8$, and a second end of the main line sampling resistor $R_S$ may be connected to the second end of the AC power source 60.

Figure 2:
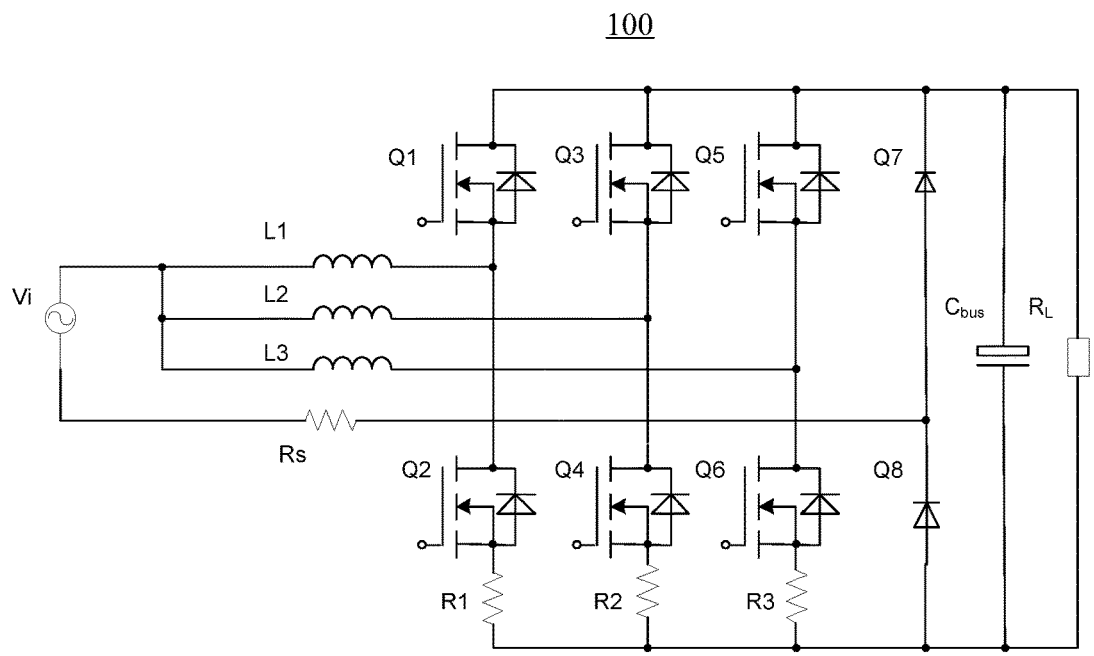
FIG. 2 is a schematic structural diagram of some embodiments of a power factor correction circuit.

In some embodiments, the first rectifier unit $Q_7$ and the second rectifier unit $Q_8$ may all be synchronous rectification switch tubes or diodes. As is shown in FIG. 2, when the first rectifier unit $Q_7$ and the second rectifier unit $Q_8$ are both diodes, a driving circuit controlling the first rectifier unit $Q_7$ and the second rectifier unit $Q_8$ may not need to be provided, further reducing the cost of the power factor correction circuit 100. As is shown in FIG. 1, when the first rectifier unit $Q_7$ and the second rectifier unit $Q_8$ are both synchronous rectification switch tubes, that is, when the first rectifier unit $Q_7$ and the second rectifier unit $Q_8$ are GaN MOSFETs, super junction MOSFETs, or SiC-MOSFET tubes as the same with the first switch unit $Q_1$, the conduction loss of the rectifier branch 30 may be reduced, and the efficiency of the power factor correction circuit 100 may be further improved.

The capacitance branch 40 may be in parallel with the power regulation branch 10 and the load $R_L$. That is, a first end of the capacitance branch 40 may be connected to the first end of the first switching unit $Q_1$, the first end of the first rectifier unit $Q_7$ and the first end of the load $R_L$ at a first common node. The second end of the capacitance branch 40 may be connected to the second end of the second switching unit $Q_2$, the second end of the second rectifier unit $Q_8$, and the second end of the load $R_L$ at a second common node. The second common node may also be referred to as the reference ground.

Specifically, the capacitance branch 40 may include an output capacitor Cbus. The first end of the first switching unit $Q_1$, the first end of the first rectifier unit $Q_7$ may be each connected to a positive electrode of the output capacitor Cbus. The second end of the second switching unit $Q_2$ and the second end of the second rectifier unit $Q_8$ may be each connected to a negative electrode of the output capacitor $C_{bus}$.

The control circuit 50 may sample the branch current $i_{L1}$ flowing through the sampling resistor $R_1$ of each branch and the main line current $I_{in}$ flowing through the main line sampling resistor $R_S$ respectively, and output the switching control signal according to the sampled branch current $i_{L1}$ and the main line current $I_{in}$. The switching control signal may be configured for performing a switching control on the corresponding power regulation branch 10. That is, by adjusting the duty cycle or the duty ratio of the corresponding switching control signal for the first switching unit $Q_1$ and the second switching unit $Q_2$ respectively, the branch current $i_{L1}$ flowing through the power regulation branch 10 and the output voltage $V_o$ of the capacitance branch 40 may be regulated.

The flow path of the branch current in the power factor correction circuit 100 is now illustrated in the context of one of the power regulation branches 10.

Figure 3:
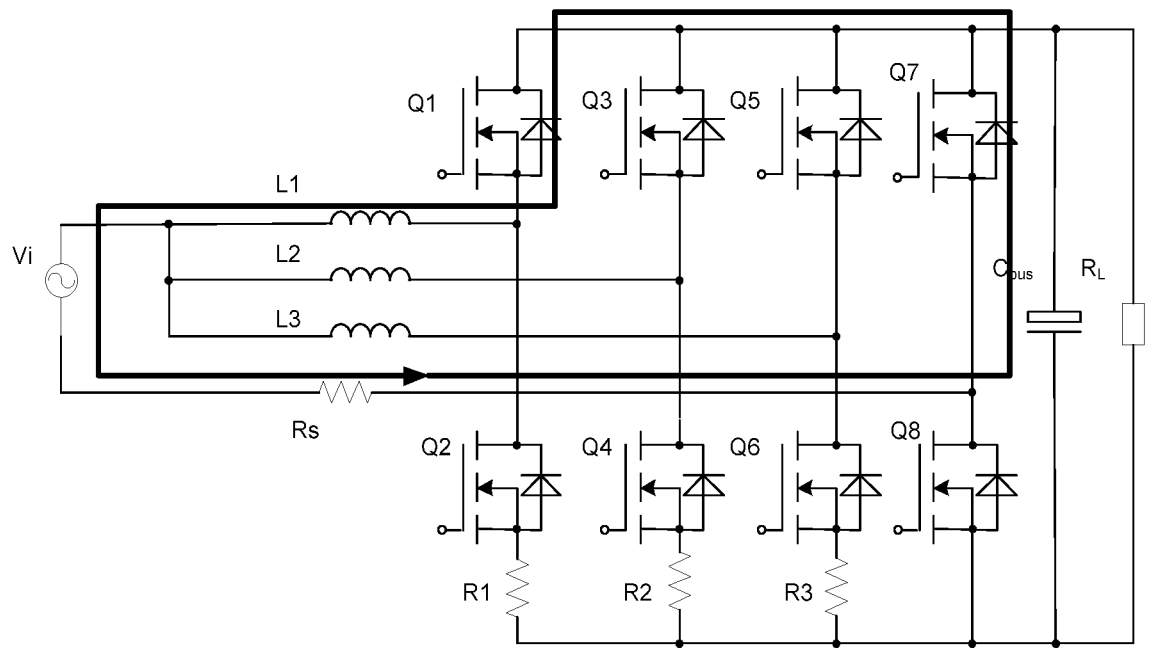
FIG. 3 is a schematic diagram of a first state of an electrical current flow path of the power factor correction circuit in FIG. 1.
Figure 4:
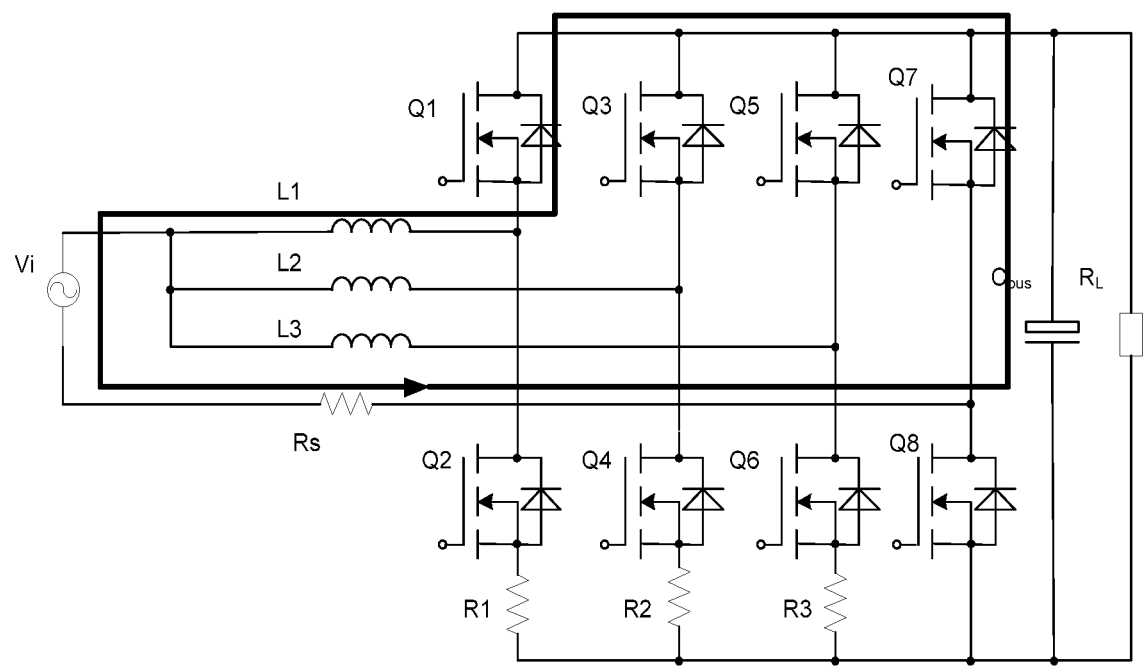
FIG. 4 is a schematic diagram of a second state of the electrical current flow path of the power factor correction circuit of FIG. 1.

When the input voltage $V_i$ of the AC power source 60 is greater than 0 ($V_i>0$), the second rectifier unit $Q_8$ of the rectifier branch 30 may be normal open, and the control circuit 50 may output a switching control signal for controlling the switching of the first switching unit $Q_1$ and the second switching unit $Q_2$. As is shown in FIG. 3, when the second switching unit $Q_2$ is on and the first switching unit $Q_1$ is off, the inductor $L_1$ may store energy from the AC power source 60, and the inductor current may increase. The inductor current may flow through the branch sampling resistor $R_1$ and the main line sampling resistor $R_S$ successively. As is shown in FIG. 4, when the second switching unit $Q_2$ is off and the first switching unit $Q_1$ is on, the energy stored in the inductor $L_1$ may charge the output capacitor Cbus, at which time the inductor current may flow through the main line sampling resistor $R_S$.

Figure 5:
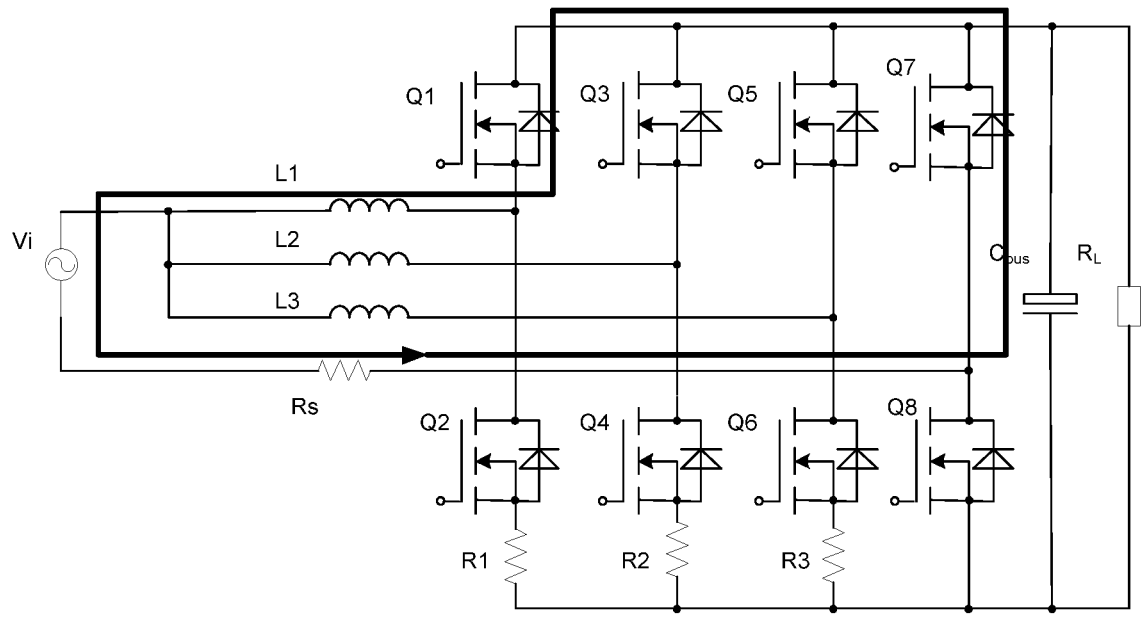
FIG. 5 is a schematic diagram of a third state of the electrical current flow path of the power factor correction circuit in FIG. 1.
Figure 6:
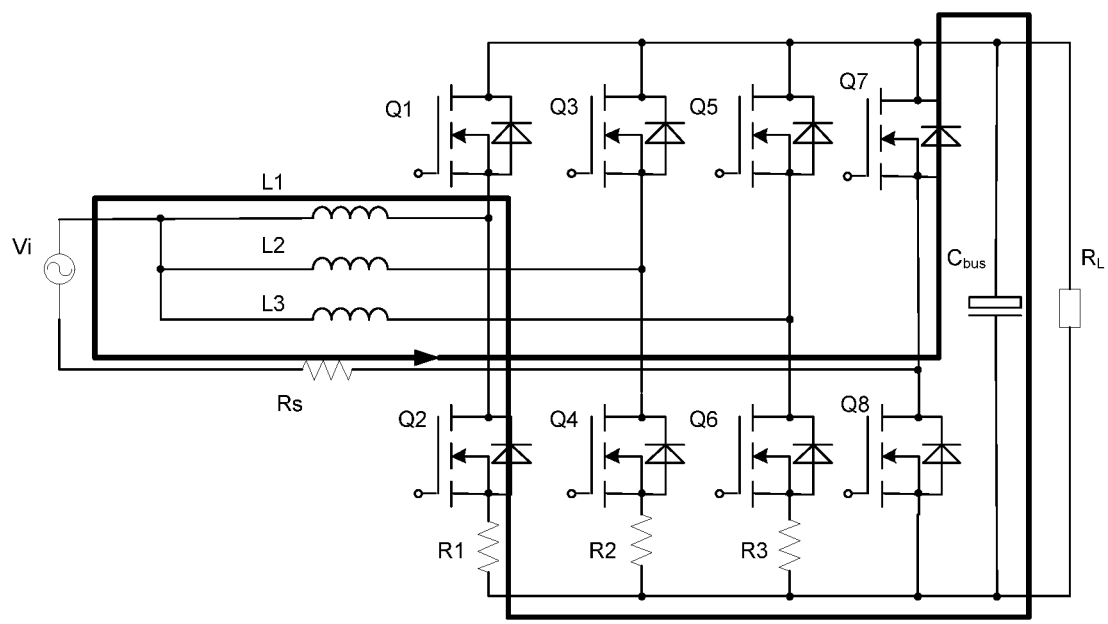
FIG. 6 is a schematic diagram of a fourth state of the electrical current flow path of the power factor correction circuit in FIG. 1.
Figure 7:
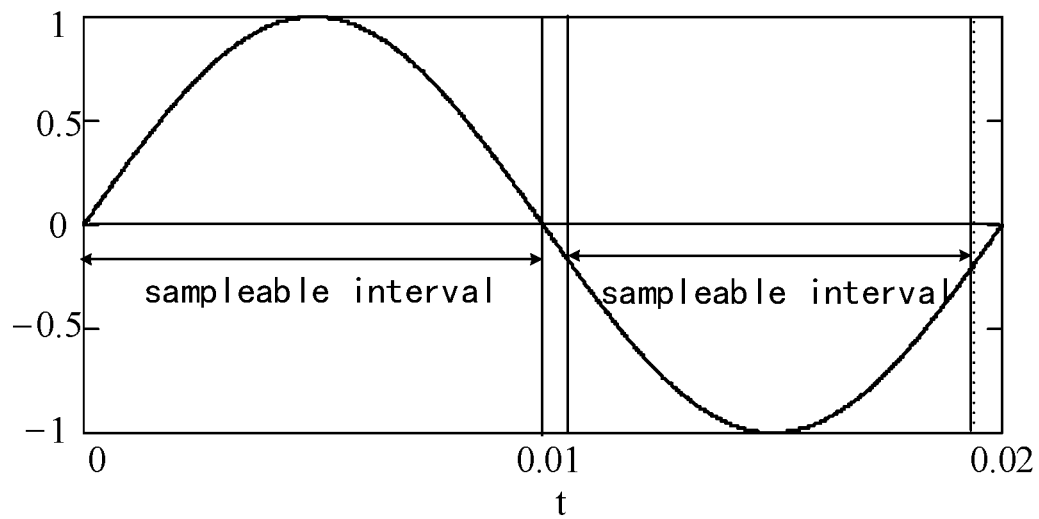
FIG. 7 is a schematic diagram of sampleable intervals of a branch current in the power factor correction circuit of FIG. 1.

When the input voltage $V_i$ of the AC power source 60 is less than 0 ($V_i<0$), the first rectifier unit $Q_7$ of the rectifier branch 30 may be normal open, and the control circuit 50 may output a switching control signal for controlling the switching of the first switching unit $Q_1$ and the second switching unit $Q_2$. As is shown in FIG. 5, when the first switching unit $Q_1$ is on and the second switching unit $Q_2$ is off, the inductor $L_1$ may store energy from the AC power source 60, and the inductor current may increase. The inductor current may flow through the main line sampling resistor $R_S$. As is shown in FIG. 6, when the first switching unit $Q_1$ is off and the second switching unit $Q_2$ is on, the energy stored in the inductor $L_1$ may charge the output capacitor $C_{bus}$, at which time the inductor current may flow through the branch sampling resistor R1 and the main line sampling resistor RS successively.

The voltage drop across the branch sampling resistor $R_1$ is equal to a value that produced by the conduction current of the second switching unit $Q_2$ multiplying the resistance of the branch sampling resistor $R_1$. The voltage drop across the branch sampling resistor $R_1$ may be acquired at a middle point in the pulse of the switching control signal. Therefore, the conduction current of the second switching unit $Q_2$ may be obtained, which is denoted as the branch current $i_{L1}$.

As is shown in FIG. 8, when the input voltage $V_i>0$, the conduction current flowing through the second switching unit $Q_2$ at a middle point in the pulse of the switching control signal may be equal to the midpoint current in the rising interval of the inductor $L_1$, i.e; equal to the average current flowing through the inductor $L_1$, and is denoted as the branch current $i_{L1}$. When the input voltage $V_i<0$, the conduction current flowing through the second switching unit $Q_2$ at a middle point in the pulse of the switching control signal may be equal to the midpoint current in the decreasing section of the inductor $L_1$, i.e., equal to the average current flowing through the inductor $L_1$, and is denoted as the branch current $i_{L1}$.

Moreover, an operating frequency of the AC power source 60 is much less than the switching frequency $f_{sw}$ of the first switching unit $Q_1$ and the second switching unit $Q_2$ of the power regulation branch 10. For example, the operating frequency of the AC power source 60 is 50 Hz, the switching frequency $f_{sw}$ is 50 kHz. That is, a plurality of branch currents $i_{L1}$ will be acquired in a sinusoidal wave cycle of the AC power 60 output voltage $V_i$. That is, the waveform of the acquired branch current $i_{L1}$ is a sinusoidal wave that is in-phase with and has a same frequency with the AC power source 60. But the branch current $i_{L1}$ could not be directly acquired in some parts of one sinusoidal wave cycle of the AC power source 60, thus the main line current $I_{in}$ may be acquired for equivalently substituting the branch current $i_{L1}$.

Thus, with the power factor correction circuit 100 provided herein, by sampling the branch current $i_{L1}$ flowing through each of the branch sampling resistors $R_1$ and the main line current $I_{in}$ flowing through the main line sampling resistor $R_S$, the electrical current flowing through the inductive branch 20 may be indirectly obtained, thus the requirement for the current sampling devices may be reduced, and the overall cost of the power factor correction circuit 100 may be effectively reduced.

Moreover, the power factor correction circuit 100 provided here in the present disclosure is a staggered and parallel power factor correction circuit, which may increase the output power, and reduce the input current harmonics.

Figure 9:
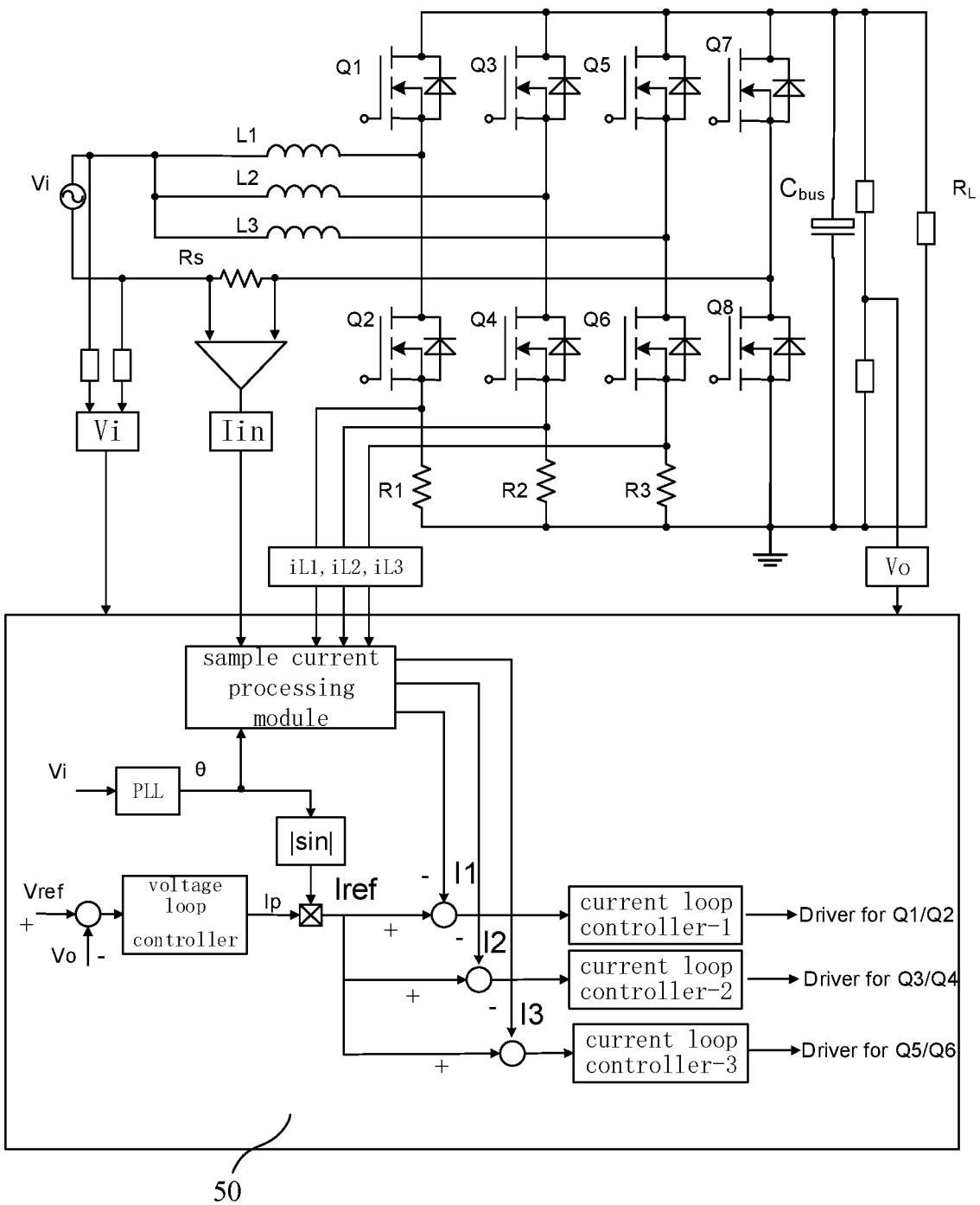
FIG. 9 is a schematic structural diagram of a power factor correction circuit according to some embodiments of the present application.

Referring to FIG. 9, the control circuit 50 further obtains a sampleable interval of each branch sampling resistor R1 in the phase variation period of the input voltage $V_i$ provided by the AC power source 60 and a current phase angle $\theta$ of the input voltage $V_i$. When the control circuit 50 determines that the current phase angle $\theta$ is in the sampleable interval, the control circuit 50 may output each switching control signal according to each corresponding branch current $i_{L1}$. When the control circuit 50 determines that the current phase angle $\theta$ is outside the sampleable interval, the control circuit 50 may output the switching control signal according to the main line current $I_{in}$.

In particular, when it is determined that the current phase angle $\theta$ is in the sampleable interval, the control circuit 50 may output each switching control signal according to a comparison result between each branch current $i_{L1}$ and a reference current $I_{ref}$. When it is determined that the current phase angle $\theta$ is outside the sampleable interval, the control circuit 50 may output each switching control signal according to a comparison result between the main line current $I_{in}$ divided by the number of the power regulation branch 10 and the reference current $I_{ref}$.

The current phase angle $\theta$ is the current phase angle of the AC power source 60. The control circuit 50 may also acquire the current amplitude of the input voltage $V_i$ of the AC power source 60, and input the current amplitude of the input voltage $V_i$ into a phase locked loop PLL to obtain the current phase angle $\theta$. The phase locked loop PLL may input the current phase angle $\theta$ into the sample current processing module. The sample current processing module may confirm that the current phase angle $\theta$ is in the sampleable interval, and output the branch current $i_{L1}$ as the input signal $I_1$ and compare the input signal $I_1$ with the reference current $I_{ref}$. Or the sample current processing module may confirm that the current phase angle $\theta$ is outside the sampleable interval, output the main line current $I_{in}$ as the input signal $I_1$ that has been equivalently transformed, and compare the input signal $I_1$ with the reference current $I_{ref}$.

Specifically, because of the multi-branch interleave of at least two power regulation branches 10 in parallel with each other, the switching sub-harmonics of the main line current $I_{in}$ are counteracted, only the smaller higher harmonics are left and flow through the main line sampling resistor $R_S$. A value produced by the main line current $I_{in}$ divided by the number of the power regulation branches 10 may be very close to the average value of the inductor current of each power regulation branch 10, and could be used as an alternative branch current in the non-sampleable interval of the branch sampling resistor R1.

The control circuit 50 may further acquire the reference output voltage $V_{ref}$ and the output voltage $V_o$, output both the reference output voltage $V_{ref}$ and the output voltage $V_o$ through an adder to get a difference value of the two, the resulting difference value may be processed by a voltage loop controller to obtain a current peak $I_p$ of the reference current $I_{ref}$. The current peak $I_p$ and the current phase angle $\theta$ which has been sinusoidal transformed may be input into a multiplier, to obtain the present reference current $I_{ref}$.

If it is determined that the current phase angle $\theta$ is in the sampleable interval, the sample current processing module may input each of the acquired branch currents $i_{L1}$ as the input signal $I_1$ into the corresponding adder, obtain through the adder the comparison result between the branch current $i_{L1}$ and the reference current $I_{ref}$, and output the switching control signal according to the comparison result, to control the switching of the corresponding power regulation branch 10. Here, the comparison result is the error signal.

If the current phase angle $\theta$ is confirmed to be outside the sample interval, then the sample current processing module may divide the main line current $I_{in}$ by the number of the power regulation branches 10 to obtain an equivalent branch current, input the equivalent branch current as the input signal $I_1$ into the corresponding adder, obtain the comparison result between the equivalent branch current and the reference current $I_{ref}$ via the adder, and output the switching control signal according to the comparison result, to control the switching of the corresponding power regulation branch 10. The comparison result is the error signal.

For example, the error signal of the branch current $i_{L1}$ and the reference current $I_{ref}$ may be modulated and processed by the current loop controller to obtain a modulated wave. The resulting modulated wave and a given carrier wave may be compared by a comparator to generate a first pulse width modulated signal. A first PWM modulator may acquire the first pulse width modulated signal and output a switching control signal of the corresponding pulse width to the second switching unit $Q_2$, to control the switching of the second switching unit $Q_2$. The first pulse width modulated signal may be further inverted by an inverter to generate a second pulse width modulated signal complementary to the first pulse width modulated signal. A second PWM modulator may acquire the second pulse width modulated signal, and output another switching control signal of corresponding pulse width to the first switching unit $Q_1$, to control the switching of the first switch unit $Q_1$.

Specifically, when the second switching unit $Q_2$ of each power regulation branch 10 is on, there is a branch current $i_{L1}$ flowing through each branch sampling resistor $R_1$. The sampleable interval may be an interval in which the conduction time or on-time of the second switching unit $Q_2$ is greater than the minimum sampling time $T_{min}$ for sampling the branch current $i_{L1}$.

The minimum sampling time $T_{min}$ may be determined by factors such as a sampling chip of the control circuit 50, a sampling peripheral circuit, processing capability of the controller, and the like. The minimum sampling time $T_{min}$ may be about 2~5 µs.

The control circuit 50 may further sample the input voltage $V_i$ and the output voltage $V_o$ of the capacitance branch 40, and calculate the sampleable interval according to a peak voltage $V_p$ of the input voltage $V_i$ acquired by sampling, the output voltage $V_o$, the previously obtained minimum sample time $T_{min}$, and the switching frequency $f_{sw}$ of the second switching unit.

Specifically, when the input voltage $V_i>0$, the sampleable interval may correspond to 0° to $\theta_p$ and 180°−$\theta_p$ to 180° in the phase intervals of the input voltage $V_i$. When the input voltage $V_i<0$, the sampleable interval may correspond to 180°+$\theta_n$ to 360°−$\theta_n$ in the phase intervals of the input voltage $V_i$.

Wherein, $$\theta_p = \sin^{-1}\left[(1 - T_{min} \times f_{sw})\frac{Vo}{Vp}\right] \text{ and } \theta_n = \sin^{-1}\left(T_{min} \times f_{sw} \times \frac{Vo}{Vp}\right).$$

For example, as is shown in FIG. 6, if the AC power source 60 is 220V/50 Hz, then its peak voltage $V_p$ is 311V, the minimum sampling time $T_{min}$ of the power factor correction circuit 100 is 3 µs, the switching frequency $f_{sw}$ is 50 kHz, the output voltage $V_o$ is 380V, then it may be acquired that $\theta_p$=90° and $\theta_n$=10.5°. The sampleable intervals in one phase variation period of the input voltage $V_i$ are 0° to 1800 and 190.5° to 349.5°, the remaining intervals 1800 to 190.5° and 349.5° to 360° are non-sampleable intervals.

Further, to avoid the effects of systematic errors, an appropriate margin remains in the sampleable intervals. That is, the non-sampleable intervals could be expanded by a percentage. For example, the non-sampleable interval may be expanded by 10%, 20% etc. For example, if the non-sample intervals 180° to 190.5° and 349.5° to 360° are each expanded by 20%, then the new non-sampleable intervals are 178.950 to 191.550 and 348.450 to 1.05°. The remaining intervals are sampleable intervals.

Thus, with the power factor correction circuit provided herein, by sampling the branch current $i_{L1}$ flowing through each of the branch sampling resistors $R_1$ and the main line current $I_{in}$ flowing through the main line sampling resistor $R_S$, the current flowing through the inductive branch 20 may be indirectly obtained, thus the requirement for the current sampling devices may be reduced, a current sampling scheme with a less cost may be employed and the overall cost of the power factor correction circuit 100 may be effectively reduced. The control circuit 50 may control the switching of each power regulation branch 10 according to the sampled branch current $i_{L1}$ and the main line current $I_{in}$. That is, by adjusting the duty cycle or the duty ratio of the switching control signal for the first switching unit $Q_1$ and the second switching unit $Q_2$ respectively, the branch current $i_{L1}$ flowing through the power regulation branch 10 and the output voltage $V_o$ of the capacitance branch 40 may be regulated.

Figure 10:
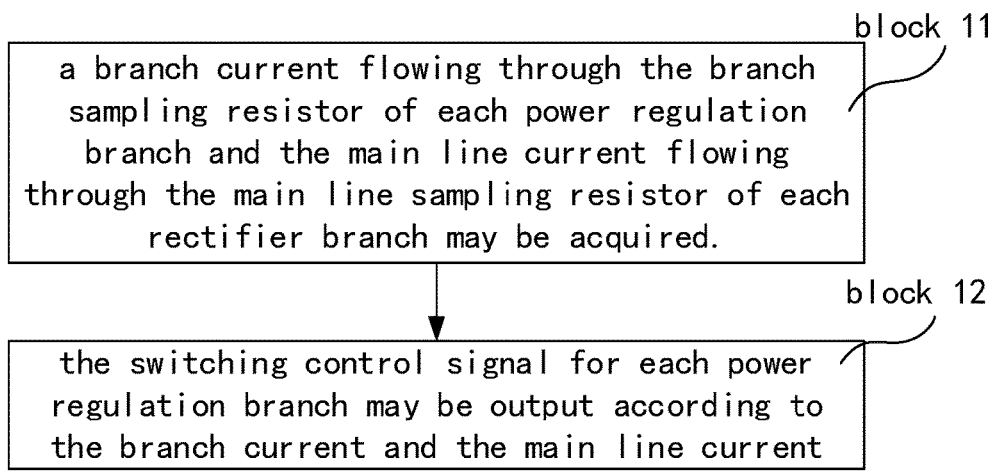
FIG. 10 is a schematic flowchart of a control method of the power factor correction circuit according to some embodiments of the present application.

Referring to FIG. 10, FIG. 10 is a schematic flowchart of a control method of the power factor correction circuit according to some embodiments of the present application.

At block 11: a branch current flowing through the branch sampling resistor of each power regulation branch and the main line current flowing through the main line sampling resistor of each rectifier branch may be acquired.

The operating frequency of the AC power source 60 in the power factor correction circuit 100 may be much less than the switching frequency $f_{sw}$ of the first switching unit $Q_1$ and the second switching unit $Q_2$ on the power regulation branch 10. For example, the operating frequency of the AC power source 60 may be 50 Hz, the switching frequency $f_{sw}$ may be 50 kHz. That is, in one sinusoidal wave cycle of the AC power source 60 output voltage $V_i$, a plurality of branch currents $i_{L1}$ may be acquired. That is, the waveform of the acquired branch current $i_{L1}$ is a sinusoidal wave that is in-phase with and has a same frequency with the AC power source 60. But the branch current $i_{L1}$ could not be directly acquired in some parts of one sinusoidal wave cycle of the AC power source 60, thus the main line current $I_{in}$ may be acquired and equivalently transformed, thereby substitutes the branch current $i_{L1}$.

At block 12: The switching control signal may be output according to the branch current and the main line current.

The switching control signals may be output according to the branch current $i_{L1}$ and the main line current $I_{in}$. The switching control signal may be configured for controlling the switching of the corresponding power regulation branch 10. As can be appreciated, in one sinusoidal wave cycle of the AC power source 60, when the branch current $i_{L1}$ could be acquired, the branch current $i_{L1}$ may be taken as an input signal to output a switching control signal, thereby controlling the switching of the corresponding power regulation branch 10. When the branch current $i_{L1}$ could not be acquired, the main line current $I_{in}$ may be acquired for an equivalent transformation, and substitute the branch current $i_{L1}$, thereby taking the main line current $I_{in}$ as an input signal to output the switching control signal.

The switching of each power regulation branch 10 may be controlled, i.e., by adjusting the duty cycle or the duty ratio of the corresponding switching control signals for the first switching unit $Q_1$ and the second switching unit $Q_2$, and the current flowing through the power regulation branch 10 and the output voltage $V_o$ of the capacitance branch 40 may be regulated.

Figure 11:
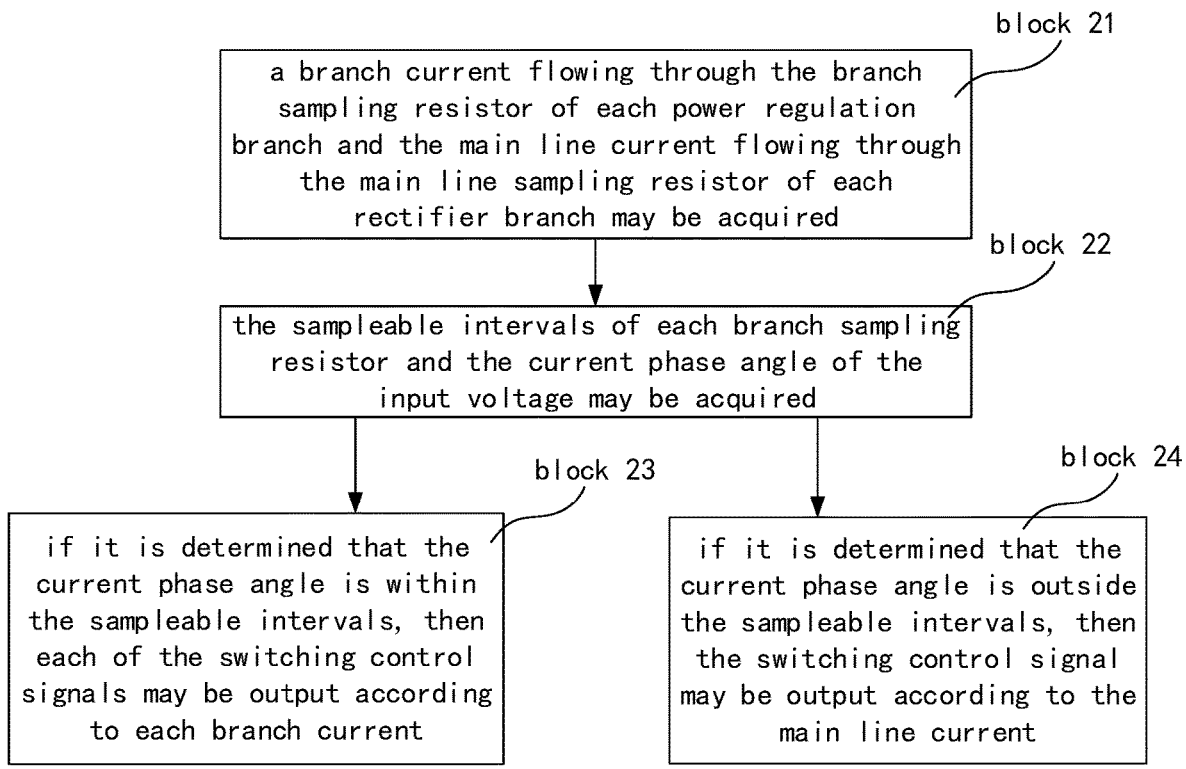
FIG. 11 is a schematic flowchart of a control method of the power factor correction circuit according to some embodiments of the present application.

Referring to FIG. 11, FIG. 11 is a schematic flowchart of a control method of the power factor correction circuit according to some embodiments of the present application.

At block 21: A branch current flowing through the branch sampling resistor of each power regulation branch and the main line current flowing through the main line sampling resistor of each rectifier branch may be acquired.

At block 22: The sampleable intervals of each branch sampling resistor and the current phase angle of the input voltage may be acquired.

The sampleable interval may be an interval in the phase variation period of the input voltage provided by the AC power source. The sampleable interval may be an interval during which the conduction time or on-time of the second switching unit $Q_2$ is greater than the minimum sampling time $T_{min}$ for sampling the branch current $i_{L1}$. The minimum sampling time $T_{min}$ may be determined by factors such as the sampling chip of the control circuit 50, the sampling peripheral circuit, processing capability of the controller, and the like. The minimum sampling time $T_{min}$ may be about 2~5 µs.

Specifically, the input voltage $V_i$ of the AC power source 60 and the output voltage $V_o$ of the capacitance branch 40 may be sampled and the sampleable intervals may be calculated according to the peak voltage $V_p$ of the input voltage $V_i$ as acquired by sampling, the output voltage $V_o$, the previously acquired minimum sampling time $T_{min}$ and the switching frequency $f_{sw}$ of the second switching unit.

Specifically, when the input voltage $V_i>0$, the sampleable interval may correspond to 0° to $\theta_p$ and 180°−$\theta_p$ to 180° in the phase intervals of the input voltage $V_i$. In some embodiments, when the input voltage $V_i<0$, the sampleable interval may corresponds to 180°+$\theta_n$ to 360°−$\theta_n$ in the phase intervals of the input voltage $V_i$.

Wherein, $$\theta_p = \sin^{-1}\left[(1 - T_{min} \times f_{sw})\frac{Vo}{Vp}\right] \text{ and } \theta_n = \sin^{-1}\left(T_{min} \times f_{sw} \times \frac{Vo}{Vp}\right).$$

For example, if the AC power source 60 is 220V/50 Hz, then its peak voltage $V_p$ is 311V, the minimum sampling time $T_{min}$ of the power factor correction circuit 100 is 3 μs, the switching frequency $f_{sw}$ is 50 kHz, the output voltage $V_o$ is 380V. It may thus be obtained that $\theta_p$=90° and $\theta_n$=10.5°. The sampleable intervals in one phase variation period of the input voltage $V_i$ are 0° to 180° and 190.5° to 349.5°, the remaining intervals 180° to 190.5° and 349.5° to 360° are non-sampleable intervals.

Further, to avoid the effects of systematic errors, an appropriate margin remains in the sample intervals. That is, the non-sampleable intervals could be expanded by a percentage. For example, the non-sampleable interval may be expanded by 10%, 20% etc. For example, if the non-sample intervals 180° to 190.5° and 349.5° to 360° are each expanded by 20%, then the new non-sampleable intervals are 178.95° to 191.55° and 348.45° to 1.05°.

The current phase angle θ is the current phase angle of the AC power source 60. For example, by acquiring the current magnitude of the input voltage $V_i$ of the AC power source 60, the current phase angle θ may be extracted. For example, the current magnitude of the input voltage $V_i$ is input into the phase locked loop PLL, thereby resulting in the current phase angle θ.

At block 23: If it is determined that the current phase angle is in the sampleable intervals, then each of the switching control signals may be output according to each corresponding branch current.

If it is determined that the current phase angle θ is in the sample intervals, then the control circuit 50 may output each switching control signal according to the comparison result between each branch current $i_{L1}$ and the reference current $I_{ref}$, to control the switching of the corresponding power regulation branch 10.

For example, the reference output voltage $V_{ref}$ and the output voltage $V_o$ of the power factor correction circuit 100 may be obtained, and the reference output voltage $V_{ref}$ and the output voltage $V_o$ may be sent to the adder to obtain their difference value. The resulted difference value may be processed by the voltage loop controller to obtain the current peak $I_p$ of the reference current $I_{ref}$, then the current peak $I_p$ and the current phase angle θ may be input into the multiplier after a sinusoidal transformation, and the present reference current $I_{ref}$ may be obtained.

Further, the branch current $i_{L1}$ may be compared with the reference current $I_{ref}$ to obtain an error signal and the switching of each power regulation branch 10 may be controlled accordingly.

In particular, the error signal is processed to obtain a modulated wave. The resulting modulated wave and the given carrier wave may be compared to obtain a first pulse width modulated signal. The first PWM modulator may acquire the first pulse width modulated signal and output a switch control signal of a corresponding pulse width to the second switching unit $Q_2$, to control the switching of the second switching unit $Q_2$. The first pulse width modulated signal may further be inverted by the inverter to obtain a second pulse width modulated signal complementary to the first pulse width modulated signal. The second PWM modulator may acquire the second pulse width modulated signal, and output another switching control signal of the corresponding pulse width to the first switching unit $Q_1$, to control the switching of the first switching unit $Q_1$.

At block 24: If it is determined that the current phase angle is outside the sampleable intervals, then the switching control signal may be output according to the main line current.

If it is determined that the current phase angle θ is outside the sample interval, the control circuit 50 may output a switching control signal according to the comparison result between the main line current $I_{in}$ divided by the number of the power regulation branches 10 and the reference current $I_{ref}$, to control the switching of each power regulation branch 10.

Specifically, the main line current $I_{in}$ may be divided by the number of the power regulation branches 10 to obtain an equivalent branch current. The equivalent branch current may be compared with the reference current $I_{ref}$ to obtain an error signal. The switching of each power regulation branch 10 may be controlled according to the error signal.

The process of controlling the switching of the power regulation branch 10 with the error signal has been described in detail at block 23 and will not be described again.

Figure 12:
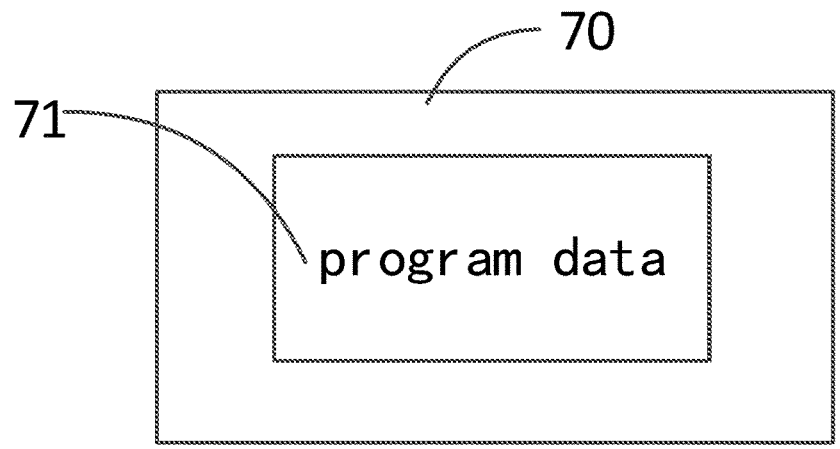
FIG. 12 is a schematic structural diagram of a storage medium according to some embodiments of the present application.

Referring to FIG. 12, which is a schematic structural diagram of a storage medium according to some embodiments of the present application.

The computer readable storage medium 70 may store program data 71 that, when executed by a processor, implements the control method of the power factor correction circuit as described in FIGS. 10-11.

The program data 71 may be stored in a computer readable storage medium 70 and comprises instructions for causing a computer device (which may be a router, a personal computer, a server or a network device, etc.) or processor to implement all or parts of the operations of the methods described in various embodiments of the present disclosure. In some embodiments, the computer readable storage medium 70 may be a U-disk, a mobile hard disk drive, a read-only memory (ROM), a random access memory (RAM), a magnetic disk or an optical disk, or any kinds of mediums which could store program data.

Figure 13:
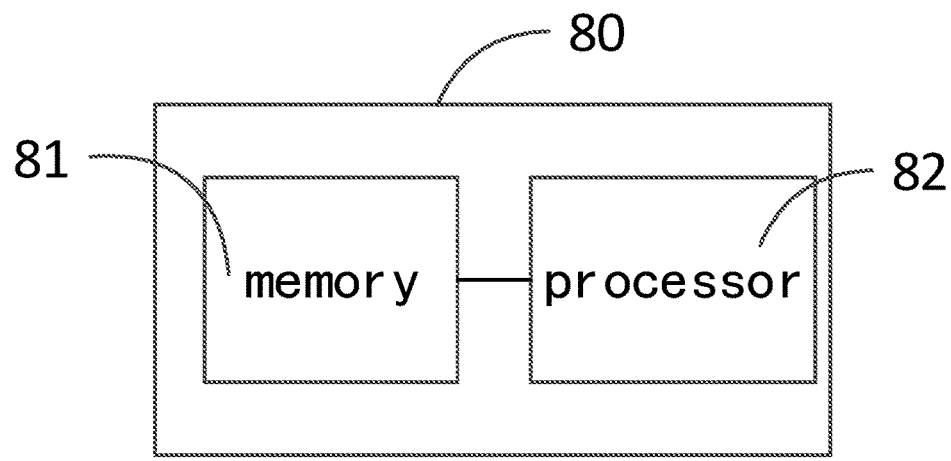
FIG. 13 is a schematic structural diagram of an electrical appliance according to some embodiments of the present application.

Referring to FIG. 13, which is a schematic structural diagram of an electrical appliance according to some embodiments of the present application.

The electrical appliance 80 may include a processor 82 and a memory 81 connected to each other. The memory 81 may stores therein a computer program that, when executed by the processor 82, implements the control method of the power factor correction circuit as described in FIGS. 10-11.

The electrical appliance may be an air conditioner, a refrigerator, a television, a blender, a dishwasher, or the like. The electrical appliance may also be a mechanical device such as a machine or an electronic device such as a cell phone or a computer. The particular type of the electrical appliance is not limited in this application.

Figure 14:
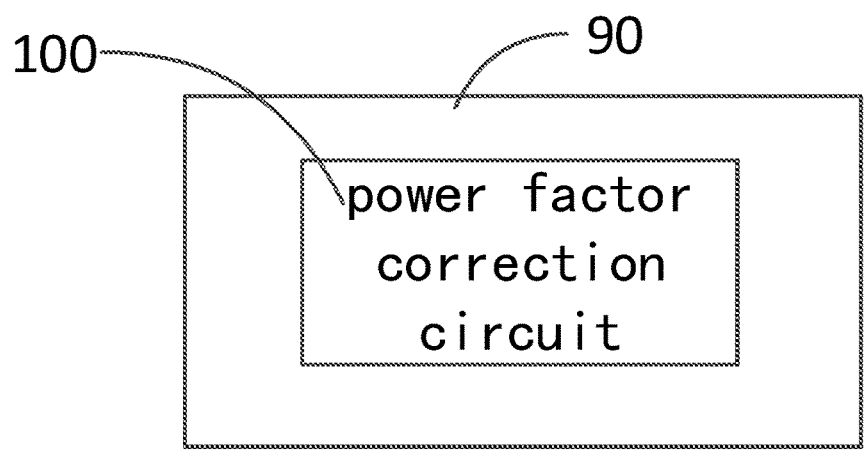
FIG. 14 is a schematic structural diagram of a household appliance according to some embodiments of the present application.

Referring to FIG. 14, which is a schematic structural diagram of a household appliance according to some embodiments of the present application.

The household appliance may include a power factor correction circuit 100 as described above. The household appliance may be an air conditioner, a refrigerator, a television, a blender, a dishwasher, or the like. The electrical appliance may also be a mechanical device such as a machine or an electronic device such as a cell phone or a computer. The particular type of the electrical appliance is not limited in this application.

Different from the prior art, the present application discloses a power factor correction circuit, a control method, a storage medium, an electrical appliance and a household appliance. Branch sampling resistors are arranged in series in each of the power regulation branches that are in parallel with each other, and the main line sampling resistor is arranged. The first end of the main line sampling resistor is connected between the first rectifier unit and the second rectifier unit, the second end of the main line sampling resistor is connected to a second end of the AC power source. The branch currents flowing through each of the branch sampling resistors and the main line current flowing through the main line sampling resistor are thus sampled, to acquire the current flowing through the inductive branch indirectly. In this way, the requirement for the current sampling devices may be reduced, electrical current sampling schemes that are relatively cheaper may be adopted and the overall cost of the power factor correction circuit may be effectively reduced.

The various embodiments in this specification have been described in a recursive manner. Similar parts among various embodiments are described with reference to each other. A feature emphasized in one embodiment may be what is distinct from other embodiments.

In particular, with respect to the storage medium embodiments and the household appliance, electrical appliance embodiments, since they are substantially similar to the method embodiments, their descriptions are relatively simple. For related details, please refer to related parts of the description of the method embodiments.

In the several embodiments provided in the present disclosure, it should be understood that, the disclosed methods and devices may be implemented in other ways. For example, the device embodiments described above are merely illustrative. For example, the division of modules or units is only a logical function division, and there may be other division manners in actual embodiments. For example, multiple units or components may be combined or integrated into another system. Or some features may be ignored or not implemented.

The units illustrated as separate components may or may not be physically separate, and the components illustrated as units may or may not be physical units. The units may be located in one place or may be distributed on multiple network units. Some or all of the units may be selected as per actual needs to fulfill the object of the present disclosure.

In addition, each functional unit in embodiments of the present disclosure may be integrated into one processing unit, or may be physically separate units, or two or more units may be integrated into one unit. The above-mentioned integrated units may be embodies in the form of hardware or software functional unit.

The above are only implementations of the present disclosure, and do not limit the patent scope of the present disclosure. Any equivalent changes to the structure or processes made by the description and drawings of this application or directly or indirectly used in other related technical field are included in the protection scope of this application.

What is claimed is:

1. A power factor correction circuit, comprising:
at least two power regulation branches connected in parallel with each other, wherein each of the power regulation branches comprises a first switching unit, a second switching unit and a branch sampling resistor connected in series sequentially;
at least two inductive branches, wherein a first end of each of the inductive branches is connected to a first end of an AC power source, and a second end of each of the inductive branches is connected between the first switching unit and the second switching unit of one corresponding power regulation branch;
a rectifier branch comprising a first rectifier unit and a second rectifier unit connected in parallel with the power regulation branch and connected in series with each other, wherein the rectifier branch further comprises a main line sampling resistor, a first end of the main line sampling resistor is connected between the first rectifier unit and the second rectifier unit, and a second end of the main line sampling resistor is connected to a second end of the AC power source;
a capacitance branch connected in parallel with the power regulation branch and a load; and
a control circuit sampling a branch current flowing through each of the branch sampling resistors and a main line current flowing through the main line sampling resistor, and outputting a switching control signal according to the branch current and the main line current obtained by sampling, wherein the switching control signal is configured for performing a switching control on a corresponding power regulation branch, wherein the control circuit further acquires a sampleable interval of each of the branch sampling resistors and a current phase angle of an input voltage, and
determines that the current phase angle is in the sampleable interval, and outputs each of the switching control signals according to of one corresponding branch current, or
determines that the current phase angle is outside the sampleable interval, and outputs the switching control signal according to the main line current;
wherein the sampleable interval is an interval in a phase variation period of the input voltage provided by the AC power source.

2. The power factor correction circuit of claim 1, wherein the control circuit determines that the current phase angle is in the sampleable interval, and outputs each of the switching control signals according to a comparison result between each of the branch currents and a reference current; or
the control circuit determines that the current phase angle is outside the sampleable interval, and outputs the switching control signal according to a comparison result between the main line current divided by a number of the power regulation branches and the reference current.

3. The power factor correction circuit of claim 1, wherein the sampleable interval is an interval during which a conduction time of the second switching unit is greater than a minimum sampling time for sampling the branch current.

4. The power factor correction circuit of claim 3, wherein the control circuit further samples the input voltage and an output voltage of the capacitance branch, and calculates the sampleable interval according a peak voltage of the input voltage acquired by sampling, the output voltage, a previously obtained minimum sampling time, and a switching frequency of the second switching unit.

5. The power factor correction circuit of claim 1, wherein the first rectifier unit and the second rectifier unit are both synchronous rectification switch tubes or diodes.

6. A control method of a power factor correction circuit, comprising:
acquiring a branch current flowing through a branch sampling resistor of each of power regulation branches and a main line current flowing through a main line sampling resistor of each of rectifier branches;
outputting a switching control signal according to the branch current and the main line current, wherein the switching control signal is configured for performing a switching control on one corresponding power regulation branch, wherein the outputting the switching control signal according to the branch current and the main line current comprises:
acquiring a sampleable interval of each of branch sampling resistors and a current phase angle of an input voltage;
determining that the current phase angle is in the sampleable interval, and outputting each of the switching control signals according to each of corresponding branch currents; or
determining that the current phase angle is outside the sampleable interval, and outputting the switching control signal according to the main line current;
wherein the sampleable interval is an interval in a phase variation period of the input voltage provided by an AC power source, wherein the sampleable interval is an interval during which a conduction time of a second switching unit is greater than a minimum sampling time for sampling the branch current;
wherein the acquiring the sampleable interval of each of the branch sampling resistors comprises:
acquiring the input voltage of the AC power source and an output voltage of a capacitance branch; and
calculating the sampleable interval according to a peak voltage of the input voltage, the output voltage, a previously obtained minimum sampling time, and a switching frequency of the second switching unit.

7. The control method of claim 6, wherein determining that the current phase angle is in the sampleable interval, and outputting each of the switching control signals according to each of corresponding branch currents comprises:
determining that the current phase angle is in the sampleable interval, and outputting each of the switching control signals according to a comparison result between each of the branch currents and a reference current.

8. The control method of claim 6, wherein the determining that the current phase angle is outside the sampleable interval, and outputting the switching control signal according to the main line current comprises:
determining that the current phase angle is outside the sampleable interval, and outputting the switching control signal according to a comparison result between the main line current divided by a number of the power regulation branches and a reference current.

9. The control method of claim 6, wherein a margin remains in the sampleable interval.

10. An electrical appliance, comprising a processor and a memory connected to each other, wherein the memory stores a computer program, wherein the computer program is configured to be executed by the processor, the computer program including instructions for:
acquiring a branch current flowing through a branch sampling resistor of each of a plurality of power regulation branches and a main line current flowing through a main line sampling resistor of each of rectifier branches;
outputting a switching control signal according to the branch current and the main line current, wherein the switching control signal is configured for performing a switching control on one corresponding power regulation branch, wherein the computer program includes instructions for outputting the switching control signal according to the branch current and the main line current, the instructions comprise:
acquiring a sampleable interval of each of branch sampling resistors and a current phase angle of an input voltage;
determining that the current phase angle is in the sampleable interval, and outputting each of the switching control signals according to each of corresponding branch currents; or
determining that the current phase angle is outside the sampleable interval, and outputting the switching control signal according to the main line current;
wherein the sampleable interval is an interval in a phase variation period of the input voltage provided by an AC power source, wherein the computer program includes instructions for acquiring the sampleable interval of each of the branch sampling resistors, the instructions comprise:
acquiring the input voltage of the AC power source and an output voltage of a capacitance branch; and
calculating the sampleable interval according to a peak voltage of the input voltage, the output voltage, a previously obtained minimum sampling time, and a switching frequency of a second switching unit.

11. The electrical appliance of claim 10, wherein the computer program includes instructions for determining that the current phase angle is in the sampleable interval, and outputting each of the switching control signals according to each corresponding branch currents, the instructions comprise:
determining that the current phase angle is in the sampleable interval, and outputting each of the switching control signals according to a comparison result between each of the branch currents and a reference current.

12. The electrical appliance of claim 10, wherein the computer program includes instructions for determining that the current phase angle is outside the sampleable interval, and outputting the switching control signal according to the main line current, the instructions comprise:
determining that the current phase angle is outside the sampleable interval, and outputting the switching control signal according to a comparison result between the main line current divided by a number of the power regulation branches and a reference current.

13. The electrical appliance of claim 10, wherein the sampleable interval is an interval during which a conduction time of the second switching unit is greater than a minimum sampling time for sampling the branch current.

14. The electrical appliance of claim 10, wherein a margin remains in the sampleable interval.

\* \* \* \* \*